(12) United States Patent
Wilson et al.

(10) Patent No.: US 9,730,400 B2
(45) Date of Patent: Aug. 15, 2017

(54) THREE DIMENSIONAL VEGETATION GROWING SYSTEMS

(71) Applicant: GRO-VOLUTION LLC, Klamath Falls, PA (US)

(72) Inventors: Eric John Wilson, Klamath Falls, OR (US); Derek T. Pallett, Klamath Falls, OR (US); Nathan C. Leung, Klamath Falls, OR (US)

(73) Assignee: GRO-VOLUTION, LLC, Klamath Falls, OR (US)

( * ) Notice: Subject to any disclaimer, the term of this patent is extended or adjusted under 35 U.S.C. 154(b) by 91 days.

(21) Appl. No.: 14/662,169

(22) Filed: Mar. 18, 2015

(65) Prior Publication Data
US 2015/0305261 A1    Oct. 29, 2015

Related U.S. Application Data

(60) Provisional application No. 61/968,316, filed on Mar. 20, 2014.

(51) Int. Cl.
| | | |
|---|---|---|
| *A01K 31/02* | (2006.01) | |
| *A01G 31/04* | (2006.01) | |
| *A01G 7/04* | (2006.01) | |

(52) U.S. Cl.
CPC ........... *A01G 31/047* (2013.01); *A01G 7/045* (2013.01); *A01G 31/045* (2013.01); *Y02P 60/216* (2015.11)

(58) Field of Classification Search
CPC ....... A01G 31/047; A01G 31/02; A01G 7/045
USPC ...................................................... 47/62 A
See application file for complete search history.

(56) References Cited

U.S. PATENT DOCUMENTS

| | | | |
|---|---|---|---|
| 4,255,896 A | | 3/1981 | Carl |
| 4,379,375 A | | 4/1983 | Eisenberg et al. |
| 4,642,939 A | * | 2/1987 | Suzuki ................... A01G 31/02 47/14 |
| 5,136,804 A | | 8/1992 | Rothem et al. |
| 5,561,943 A | | 10/1996 | Valstar |

(Continued)

FOREIGN PATENT DOCUMENTS

WO    WO2013044343    4/2013

*Primary Examiner* — Monica Williams
(74) *Attorney, Agent, or Firm* — Jerry Haynes Law

(57) ABSTRACT

Three-dimensional vegetation growing systems provide an enclosed hydroponic environment for growing plants. The system serves to uniformly expose the plants to nutrients, liquids, and light from multiple directions while the plant rotates. In some embodiments, the three-dimensional vegetation growing systems may include a system housing configured to form an enclosed hydroponic growing environment; at least one light source in the system housing, the at least one light source configured to emit light; a distribution portion in the system housing, the distribution portion configured to discharge a vegetation growth sustaining liquid; and at least one conveyor device in the system housing, the at least one conveyor device disposed in proximity to the distribution portion, the at least one conveyor device configured to support vegetation and rotate the vegetation in the system housing as the vegetation receives the vegetation growth sustaining liquid from the distribution portion and the light from the at least one light source. Other embodiments of the three-dimensional vegetation growing systems are also disclosed.

6 Claims, 12 Drawing Sheets

(56) References Cited

U.S. PATENT DOCUMENTS

| | | | |
|---|---|---|---|
| 5,617,673 A * | 4/1997 | Takashima | A01G 31/047 47/39 |
| 5,937,575 A | 8/1999 | Zobel et al. | |
| 6,021,602 A | 2/2000 | Orsi | |
| 6,508,033 B2 | 1/2003 | Hessel et al. | |
| 6,604,321 B2 * | 8/2003 | Marchildon | A01G 31/047 47/62 R |
| 7,134,240 B1 * | 11/2006 | Neal | A01G 31/02 47/60 |
| 7,181,886 B2 * | 2/2007 | Bourgoin | A01G 31/047 47/59 R |
| 7,823,328 B2 | 11/2010 | Walhovd | |
| 8,484,890 B2 | 7/2013 | Simmons | |
| 8,505,238 B2 | 8/2013 | Lubbers et al. | |
| 8,533,993 B2 | 9/2013 | Pettibone | |
| 2002/0162275 A1 | 11/2002 | Robinson | |
| 2004/0111965 A1 | 6/2004 | Agius | |
| 2004/0237396 A1 * | 12/2004 | Castillo | A01C 1/02 47/61 |
| 2007/0251145 A1 | 11/2007 | Brustatore | |
| 2009/0165373 A1 | 7/2009 | Souvlos et al. | |
| 2013/0255145 A1 * | 10/2013 | Wiggins | A01G 9/20 47/17 |
| 2014/0020292 A1 | 1/2014 | McNamara et al. | |

* cited by examiner

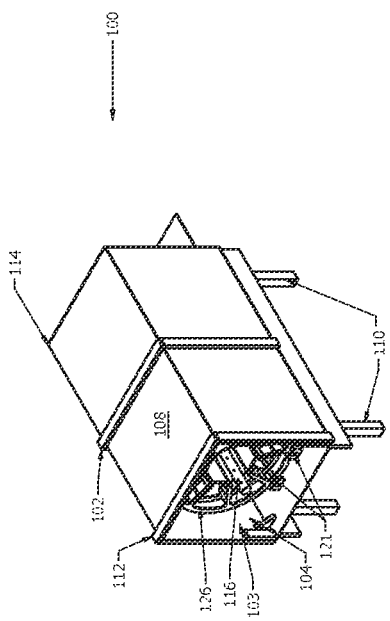
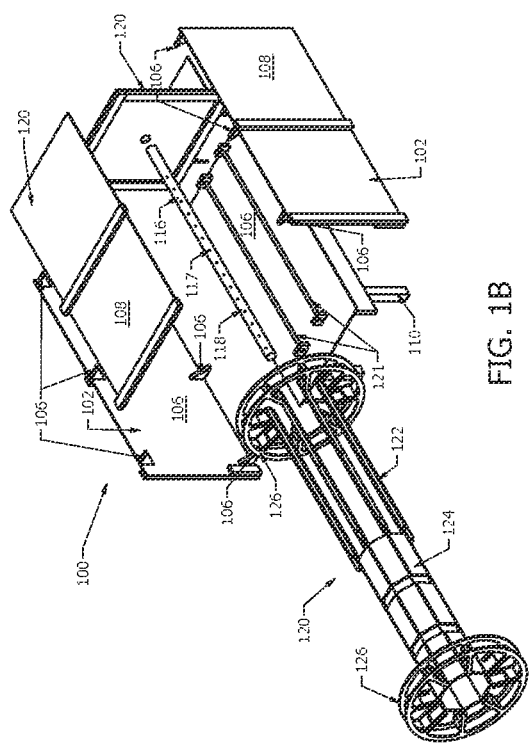

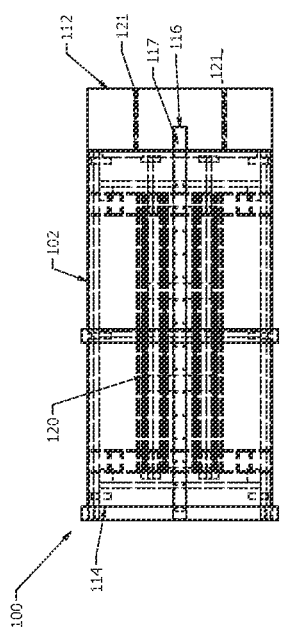
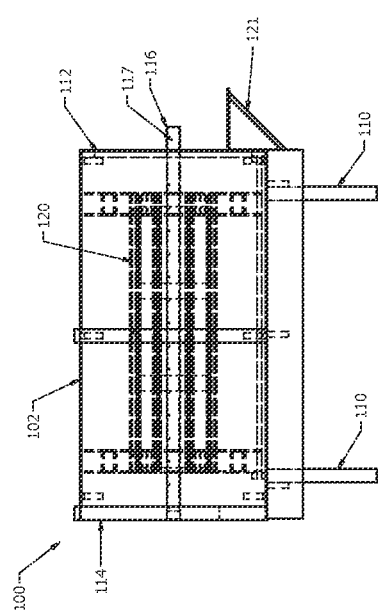
FIG. 2A
FIG. 2B

THREE DIMENSIONAL VEGETATION GROWING SYSTEMS

CROSS-REFERENCE TO RELATED APPLICATIONS

This application claims the benefit of U.S. provisional application No. 61/968,316, filed Mar. 20, 2014 and entitled "THREE DIMENSIONAL GROWING SYSTEM", which provisional application is incorporated by reference herein in its entirety.

FIELD OF THE INVENTION

Illustrative embodiments of the disclosure generally relate to three-dimensional vegetation growing systems. More particularly, illustrative embodiments of the disclosure generally relate to three-dimensional vegetation growing systems which expose vegetation to nutrients, liquids and light.

SUMMARY OF THE INVENTION

Illustrative embodiments of the disclosure are generally directed to three-dimensional vegetation growing systems for rotatably exposing vegetation to nutrients, liquids and light. In some embodiments, the three-dimensional vegetation growing system may include a system housing configured to form an enclosed hydroponic growing environment; at least one light source in the system housing, the at least one light source configured to emit light; a distribution portion in the system housing, the distribution portion configured to discharge a vegetation growth sustaining liquid; and at least one conveyor device in the system housing, the at least one conveyor device disposed in proximity to the distribution portion, the at least one conveyor device configured to support vegetation and rotate the vegetation in the system housing as the vegetation receives the vegetation growth sustaining liquid from the distribution portion and the light from the at least one light source.

In some embodiments, the three-dimensional vegetation growing systems may include a liquid reservoir; at least one planter tray assembly including an assembly frame; at least one planter tray carried by the assembly frame, the at least one planter tray configured to support vegetation and having a plurality of tray openings; a plurality of discharge nozzles in proximity to the at least one planter tray, the plurality of discharge nozzles disposed in fluid communication with the liquid reservoir; and at least one pump disposed in fluid communication with and between the liquid reservoir and the plurality of discharge nozzles.

In some embodiments, the three-dimensional vegetation growing systems may include a system housing having a system housing interior; at least one light source in the system housing interior of the system housing; at least one planter tower in the system housing interior in light-receiving proximity to the at least one light source, the at least one planter tower having: a tower shell disposed for rotation; a plurality of liquid dispensing openings in the tower shell; a tower conduit in the tower shell, the tower conduit stationary relative to the tower shell; and a plurality of fluid discharge nozzles communicating with the tower conduit; and a tower rotation motor drivingly engaging the tower shell of the at least one planter tower for rotation.

BRIEF DESCRIPTION OF THE DRAWINGS

Illustrative embodiments of the disclosure will now be described, by way of example, with reference to the accompanying drawings, in which:

FIG. 1A is a detailed upper angle perspective view of an exemplary three-dimensional vegetation growing system;

FIG. 1B is an exploded perspective view of the exemplary three-dimensional vegetation growing system illustrated in FIG. 1A;

FIG. 2A is a top sectional view of the exemplary three-dimensional vegetation growing system illustrated in FIG. 1A;

FIG. 2B is a side sectional view of the exemplary three-dimensional vegetation growing system illustrated in FIG. 1A;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are, therefore, not to be considered as limiting, unless the claims expressly state otherwise.

Figure 3:
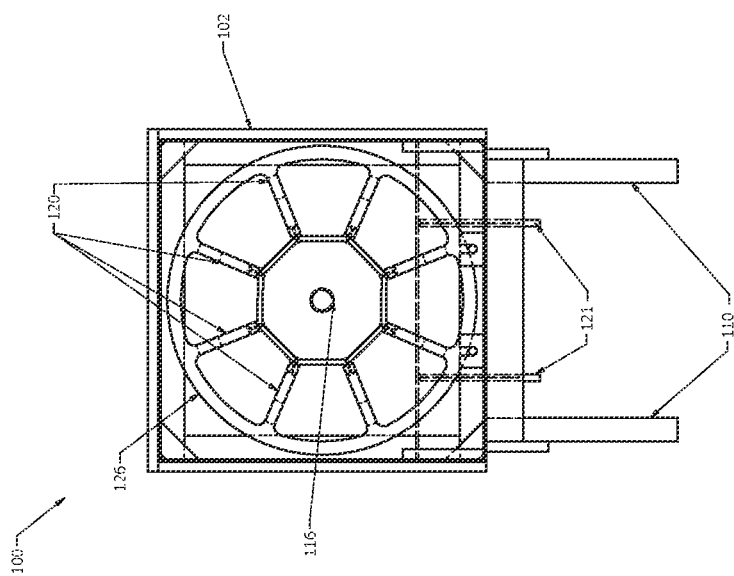
FIG. 3 is a front sectional view of the exemplary three-dimensional vegetation growing system in FIG. 1A.
Figure 4:
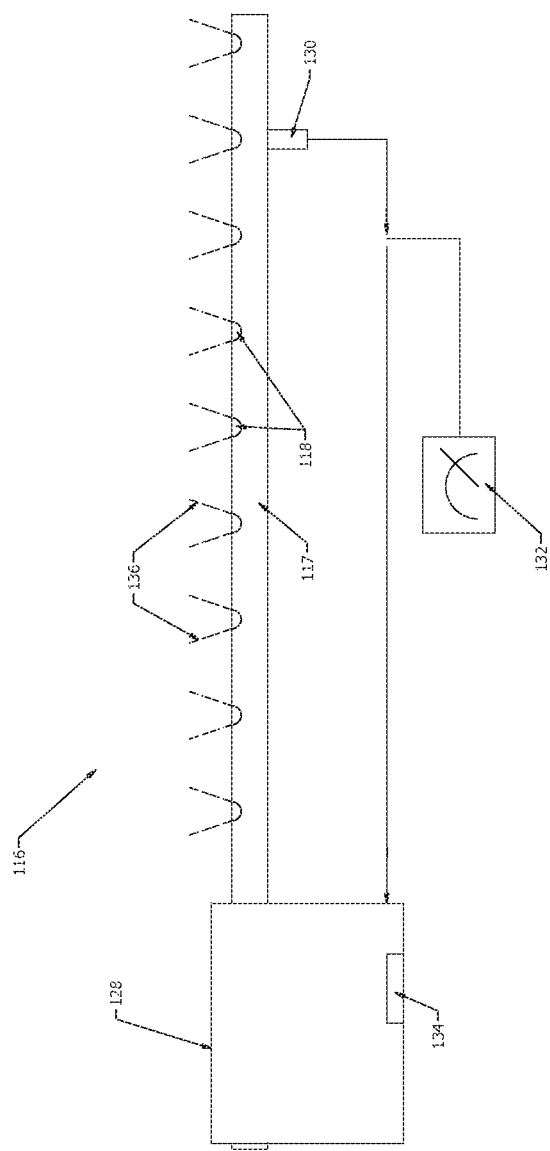
FIG. 4 is a partially schematic side view of an exemplary distribution portion of the three-dimensional vegetation growing system illustrated in FIG. 1A as the distribution portion emits a fine spray in typical operation of the three-dimensional vegetation growing system.

Referring initially to FIGS. 1A-4 of the drawings, an illustrative embodiment of the three-dimensional vegetation growing systems, hereinafter system, is generally indicated by reference numeral 100. The system 100 provides an enclosed hydroponic environment 103 (FIG. 1A) for growing vegetation such as at least one plant (not shown). The hydroponic growing environment 103 may be configured to rotatably expose the vegetation to a vegetation growth-sustaining liquid which may be discharged as a fine spray 136 (FIG. 4). The vegetation growth-sustaining liquid may include at least one nutrient. At least one light source may include at least one illumination portion 106 (FIG. 1B) which provides a uniform emission of light to the vegetation during rotation. Those skilled in the art will recognize that hydroponics involves growing plants, herbage and other vegetation with a growth medium such as a mineral nutrient solution diluted in water. Generally, soil is not used as the growth medium with hydroponics. This soil-free method enables vertical, horizontal and mobile growth along with other nontraditional means of harvesting plants. It is also known in the art that terrestrial plants may be grown with their roots in the mineral nutrient solution only or in an inert medium such as perlite, gravel, mineral wool or the like. Illustrative embodiments of the present disclosure form a self-enclosed hydroponic growing environment 103 which may recycle nutrients and liquids while also inhibiting common detriments to plant growth.

In some embodiments, the system 100 may serve to uniformly expose the vegetation to nutrients, liquids and light from multiple directions while the vegetation rotates on at least one conveyer device 120. The conveyer device 120 may carry the vegetation along a helical growing path while the nutrients, liquids and light are simultaneously applied to the vegetation. To this end, the conveyor device 120 may have a corkscrew configuration in some embodiments. The nutrients, liquids and light may be dispersed and oriented to contact the vegetation from various directional planes such as length, width, height, depth and breadth, for example and without limitation. The uniform distribution of the nutrients, liquids and light applied to the vegetation may facilitate precise and regular control of the enclosed hydroponic environment 103. After application to the vegetation, surplus portions of the nutrients and liquids may be collected and re-circulated for subsequent application to the vegetation.

Those skilled in the art will recognize that multidirectional reception of nutrients, liquids and light by the vegetation is especially effective for a hydroponic system since the vegetation does not require vertical anchoring to a stationary growth medium such as soil. Rather, a more versatile hydroponic growth medium may compact and conform inside at least one conveyer device 120 that forms a substrate for growing and rotating the vegetation. Non-limiting examples of hydroponic growth media which are suitable for the purpose include organic or inorganic fiber materials; wheat chaff or any chaff from harvesting a product such as oats, barley, etc.; rice hull or other hull material; hay such as grass, alfalfa, etc.; hydroton (fired clay pellets); rock wool; oak leaves; composted soil material; perlite; pumice stone; fired brick chip; hydro gel; sand; gravel of various sizes; or any combination thereof. While attached to the conveyor device 120, the vegetation may be traversed in a helical, three-dimensional growth pathway. Consequently, the perpetual rotation provided by the conveyer device 120 may enable the vegetation to receive uniform quantities of nutrients, liquids and lighting during the helical rotation. Additionally, the nutrients and liquids may be conserved by collection and recirculation for multiple applications to the vegetation. Another recyclable advantage may include emission of the light from at least one illumination portion 106, which may be fluorescent and may be solar powered in some embodiments.

In some embodiments, the three-dimensional vegetation growing system 100 for rotatably exposing plants to nutrients, liquids and light on a conveyor may include:
a system housing 102 configured to form an enclosed hydroponic growing environment 103, the system housing 102 comprising an outer housing surface 108 configured to form a protective barrier, the system housing 102 further comprising an inner housing surface 104 (FIG. 1A), the inner housing surface 104 comprising at least one illumination portion 106 configured to emit a light;
a distribution portion 116 disposed inside the system housing 102, the distribution portion 116 configured to emit or discharge a vegetation growth sustaining liquid having at least one nutrient as a generally fine spray 136 (FIG. 4); and
at least one conveyor device 120 disposed inside the system housing 120 in proximity to the distribution portion 116, the at least one conveyor device 120 configured to support and carry vegetation which may include at least one plant, the at least one conveyor device 120 may further be configured to rotate in a generally helical path and enable the vegetation to receive the light and vegetation growth-sustaining liquid from the distribution portion 116.

In a second aspect, the system housing 102 may include a transport container having a generally rectangular shape.

In another aspect, the system housing 102 may be configured to regulate the temperature of the enclosed hydroponic growing environment 103.

In another aspect, the outer surface 108 of the system housing 102 may protect the plant or plants against weather elements, insects, heat, cold and disease.

In another aspect, the illumination portion 106 may include at least one fluorescent light.

In another aspect, the distribution portion 116 may include an atomizer 128 (FIG. 4) configured to convert the vegetation growth sustaining liquid into the fine spray 136, the atomizer 128 may include a piezoelectric atomizer.

In another aspect, the distribution portion 116 may include a distribution conduit 117 such as a pipe which is configured to carry the vegetation growth sustaining liquid from the atomizer 128 and dispense the vegetation growth sustaining liquid onto the vegetation.

In another aspect, the distribution portion 116 may include at least one aperture 118 in the distribution conduit 117, the at least one aperture 118 configured to discharge the vegetation growth sustaining liquid onto the vegetation.

In another aspect, the distribution portion 116 may include a return conduit 130 (FIG. 4) which communicates with the distribution conduit 117 and is configured to collect and recycle an excess or surplus portion of the vegetation growth sustaining liquid back to the atomizer 128 for reapplication to the vegetation.

In another aspect, the fine spray 136 may include a fog, mist and/or cloud.

In another aspect, the vegetation growth sustaining liquid may include water.

In another aspect, the nutrient in the vegetation growth sustaining liquid may include nitrogen, potassium and/or phosphorous.

In another aspect, the at least one conveyor device 120 may be configured to carry the vegetation between a first housing end 112 and a second housing end 114 (FIG. 1A) of the system housing 102.

In another aspect, the at least one conveyor device 120 may include an inner conveyor section 122, the inner conveyor section 122 may include a hydroponic growth medium configured to help support the vegetation, the hydroponic growth medium may include organic or inorganic fiber materials; wheat chaff or any chaff from harvesting a product such as oats, barley, etc.; rice hull or other hull material; hay such as grass, alfalfa, etc.; hydroton (fired clay pellets); rock wool; oak leaves; composted soil material; perlite; pumice stone; fired brick chip; hydro gel; sand; gravel of various sizes; or any combination thereof.

In another aspect, the at least one conveyor device 120 may include an outer conveyor section 124 which extends from the inner conveyor section 122 and is configured to project the vegetation.

In another aspect, a generally helical travel path of the vegetation may be configured to enable generally uniform application of the light, nutrient and/or liquid to the vegetation.

In another aspect, the system 100 may include at least one conveyor drive system 126 configured to actuate rotation of the at least one conveyor device 120.

FIG. 1A illustrates an illustrative embodiment of the three-dimensional vegetation growing system 100 for exposing vegetation which may include at least one plant to a vegetation growth sustaining liquid having one or more nutrients and one or more liquids and to light as the vegetation grows on a conveyor device 120 which may carry the vegetation along a spiral or helical travel path. The system 100 may include a system housing 102 that forms a protective shell or barrier over the components of the system 100. In some embodiments, the system housing 102 may include a standard or conventional cargo container having a substantially rigid, rectangular shape. The system housing 102 may form a self-contained, enclosed hydroponic environment 103 for growing the vegetation (not shown).

The system housing 102 may include an outer housing surface 108 which may be at least partially insulated to protect the enclosed hydroponic environment 103 against excessive heat. In some embodiments, the system housing 102 may further include inner housing surfaces 104 (FIG. 1A). At least one light source may be provided in the system housing 102. In some embodiments, the light source may include at least one illumination portion 106 on the inner housing surfaces 104. The at least one illumination portion 106 supplies light to the vegetation. The illumination portion 106 may be oriented to emit the light at an optimal direction and intensity onto the vegetation. In some embodiments, multiple illumination portions 106 may be provided on the respective inner housing surfaces 104 of the system housing 102. At least one of the illumination portions 106 may include, for example and without limitation, a fluorescent light. In some embodiments, at least one of the illumination portions 106 may be powered by at least one of a solar panel, an external electrical source and an internal battery. The system housing 102 may also include a first housing end 112 and a second housing end 114 between which the vegetation traverses in typical application of the system 100, which will be hereinafter described.

As illustrated in FIG. 1B, a distribution portion 116 may be provided in the system housing 102 for distributing or applying the vegetation growth sustaining liquid onto the vegetation. In some embodiments, the distribution portion 116 may be configured to apply a generally uniform distribution of the vegetation growth sustaining liquid onto the plant as a fine spray or mist 136 (FIG. 4). The distribution portion 116 may include a distribution conduit 117 that extends from the first housing end 112 to the second housing end 114 of the system housing 102 such that the fine spray 136 is fully applied to the vegetation with an even distribution. The nutrient in the vegetation growth sustaining liquid may include nitrogen, potassium, phosphorous, micronutrients or any combination thereof, for example and without limitation. The vegetation growth sustaining liquid may include water, a liquid growth solution, air or any combination thereof, for example and without limitation. In some embodiments, atomized water may be discharged from the distribution conduit 117 against the vegetation in a fine spray 136 (FIG. 4). Surplus portions of the vegetation growth sustaining liquid may be collected from the vegetation and recycled for reuse.

As illustrated in FIGS. 1B, 2A and 2B, at least one conveyor device 120 may be provided in the system housing 102. In some embodiments, the conveyor device 120 may be configured to carry the vegetation along a generally helical or spiral travel path. In some applications of the system 100, the conveyor device 120 may support the vegetation for transport during growth from germination to fully-grown vegetation which is ready for harvesting. A conveyor device support frame 121 may be provided in the system housing 102 to support the conveyor device 120 in the system housing 102. The conveyor device support frame 121 may have any structure or design which is deemed suitable for the purpose to those skilled in the art.

As illustrated in FIG. 1B, the conveyor device 120 may include a generally elongated inner conveyor section 122. A generally elongated outer conveyor section 124 may extend from the inner conveyor section 122. At least one conveyor drive system 126 may drivingly engage the conveyor device 120 for rotation according to the knowledge of those skilled in the art. In some embodiments, a pair of conveyor drive systems 126 may drivingly engage the respective inner conveyor section 122 and outer conveyor section 124 of the conveyor device 120, as illustrated in FIG. 1B. In some applications of the system 100, a growth medium (not illustrated) may be provided in the inner conveyor section 122 of the conveyor device 120. The vegetation may have roots (not illustrated) which anchor into the growth medium. The vegetation may remain anchored into the conveyor device 120, typically rotating in the helical path formed by the conveyor device 120 from the first housing end 112 to the second housing end 114 of the system housing 102 as the vegetation grows outwardly and extends from the inner conveyor section 122 into the outer conveyor section 124. The conveyor device 120 may be aligned through the system housing 102 in series, parallel or combinations thereof. In some embodiments, at least one housing support portion 110 may elevate and support the system housing 102 and the internal components, including the conveyor device 120, of the system 100. The housing support portion 110 may include legs that retractably or hingedly extend from each corner of the outer housing surface 108. In some embodiments, the housing support portion 110 may be selectively detachable form the system housing 102 according to the knowledge of those skilled in the art.

FIG. 3 illustrates eight conveyor devices 120 which are disposed parallel to and rotate around a central distribution portion 116. Each conveyor device 120 may rotate independently or in conjunction with the other conveyor devices 120. In any case, the vegetation may follow the typically helical path taken by the corresponding conveyor device 120 which supports the vegetation. A typically helical path of each conveyor device 120 may enable the vegetation to receive a uniform, three-dimensional exposure to the light and the vegetation growth sustaining liquid which is dispensed from the distribution portion 116. In some embodiments, the travel path for the vegetation may, however, be a simple 360° rotation at a predetermined angular velocity rather than a helical or spiral travel path. In some alternative embodiments, at least a portion of the travel path followed by at least one conveyor device 120 may include an undulating travel path having alternating upward and downward portions and a return portion which loops back to the undulating portion. In some embodiments, at least one conveyor device 120 may include a generally annular polyvinyl chloride tubing. In other embodiments, any number, shape or size for the at least one conveyor device 120 may, however, be utilized.

FIG. 4 illustrates an exemplary distribution portion 116 which is suitable for distributing the vegetation growth sustaining liquid as a generally fine spray 136 over the vegetation (not illustrated) as the vegetation is rotated on the conveyor device 120 (FIG. 1B). The distribution portion 116 may be stationary or rotatable along an axis. The vegetation growth sustaining liquid may be introduced into the distribution portion 116 through an inlet (not shown) in the distribution portion 116. As further illustrated in FIG. 4, in some embodiments, the distribution portion 116 may include an atomizer 128 which converts the vegetation growth sustaining liquid into a fine spray 136 such as a fog, mist or cloud. A fan 134 may be provided in the atomizer 128 to force the fine spray 136 through the distribution portion 116. A meter 132 may be positioned along the distribution portion 116 to monitor the pressure of the vegetation growth sustaining liquid as it flows from the atomizer 128. The atomizer 128 may include a pressure differential that forces the vegetation growth sustaining liquid through an atomizer nozzle (not shown) and onto the vegetation on the conveyor device 120. Any known form of fine spray 136 dispersion which is known by those skilled in the art may, however, be utilized. In some embodiments, the atomizer 128 may include a piezoelectric atomizer known by those skilled in the art.

As further illustrated in FIG. 4, in some embodiments, the distribution portion 116 may include a distribution conduit 117 which is configured to discharge the vegetation growth sustaining liquid onto the vegetation as the vegetation travels on the conveyor device 120 along the travel path. The distribution conduit 117 may be disposed in liquid communication with the atomizer 128. The distribution conduit 117 may extend adjacent and parallel to a longitudinal axis of the conveyor device 120 and may be positioned in proximity to the vegetation on the conveyor device 120. In some embodiments, the distribution conduit 117 may include a generally annular polyvinyl chloride tubing. In other embodiments, the distribution conduit 117 may be manufactured from various materials and have various shapes. The distribution conduit 117 may further include at least one aperture 118 through which the vegetation growth sustaining liquid may be discharged as a fine spray 136 onto the vegetation. In some embodiments, a return conduit 130 may establish communication between the distribution conduit 117 and the atomizer 128. The return conduit 130 may collect and distribute excess or surplus portions of the vegetation growth sustaining liquid back to the atomizer 128 for recycling and reuse. In some embodiments, a funnel (not shown) may capture the excess portions of the vegetation growth sustaining liquid for distribution into the return conduit 130.

The system 100 may provide numerous advantages to growing plants and other vegetation. The system 100 may be portable and disassemble for shipping. The system 100 may also enable year-round growth of vegetation due to the self-enclosed climate control capabilities of the system housing 102. The types of vegetation grown in the system 100 may also be changed periodically with no concern for soil analysis and conditions, since the growth medium is portable and easily changed in the hydroponic format. Further, use of the nutrients and liquids in the vegetation growth sustaining liquid may be optimized due to the return conduit 130 and the uniform distribution effected through the fine spray 136.

Referring next to FIGS. 5-8 of the drawings, an alternative illustrative embodiment of the three-dimensional vegetation growing systems is generally indicated by reference numeral 200. The system 200 may include a liquid reservoir 201. The liquid reservoir 201 may contain a supply of vegetation growth sustaining liquid which may include at least one nutrient. A reservoir outlet conduit 202 may be disposed in fluid communication with the liquid reservoir 201. A manifold 203 may communicate with the reservoir outlet conduit 202. The manifold 203 may include a pair of parallel manifold conduits 204. A pair of liquid pumps 205 may be provided in the respective manifold conduits 204. An assembly inlet conduit 208 may communicate with the manifold conduits 204 of the manifold 203. A backflow container 228 may communicate with the assembly inlet conduit 208 through a backflow conduit 229.

A pressure relief valve 210 may be provided in the assembly inlet conduit 208 between the manifold conduits 204 of the manifold 203. A surplus liquid conduit 216 may communicate with the pressure relief valve 210. A liquid return container 222 may communicate with the surplus liquid conduit 216. A reservoir inlet conduit 224 may establish communication between the liquid return conduit 222 and the liquid reservoir 201. A liquid return conduit 220 may communicate with the liquid return container 222 for purposes which will be hereinafter described.

Figure 5:
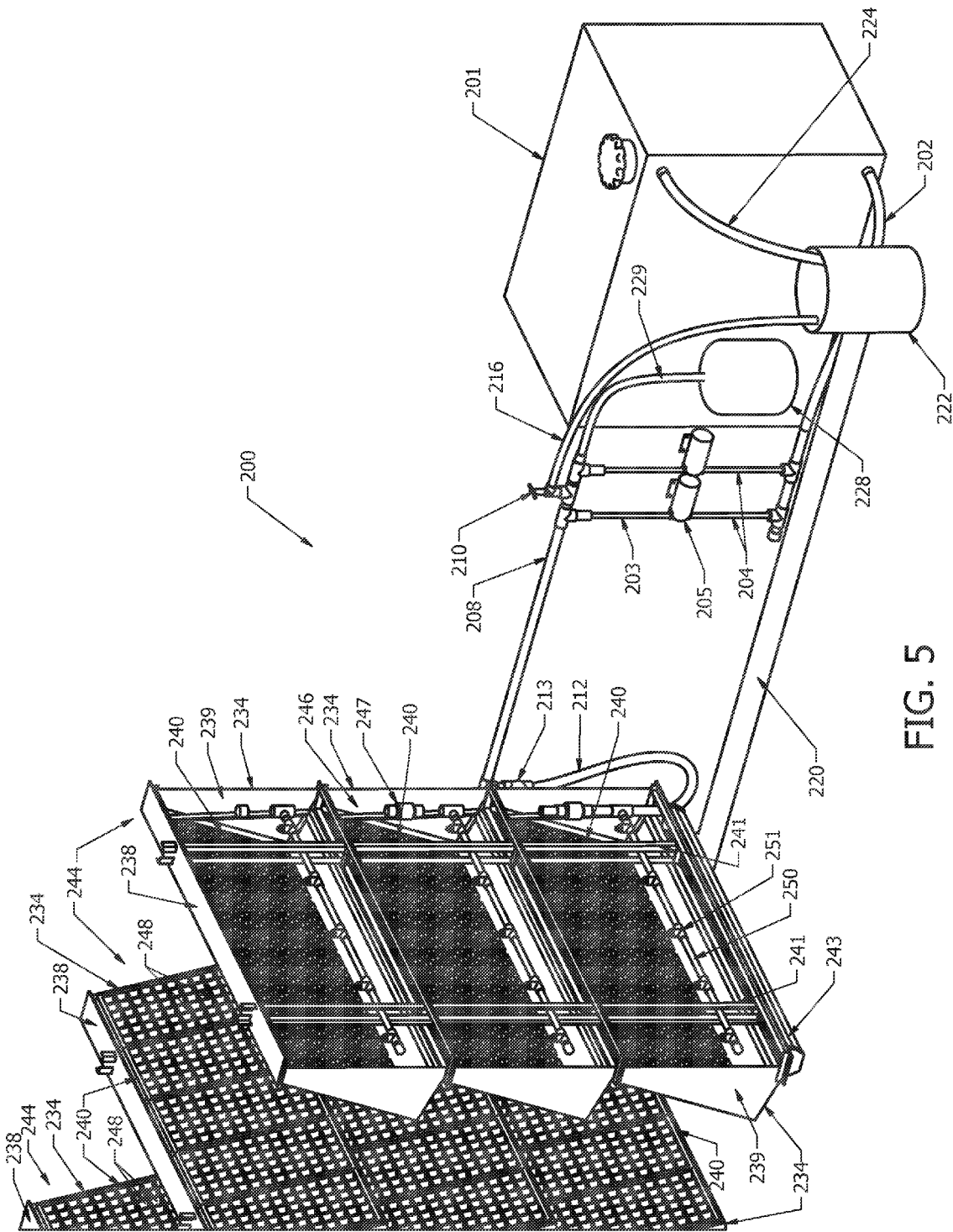
FIG. 5 is a perspective view of an alternative illustrative embodiment of the three-dimensional vegetation growing systems, with a pair of vegetation growing towers of the system illustrated in section.
Figure 6:
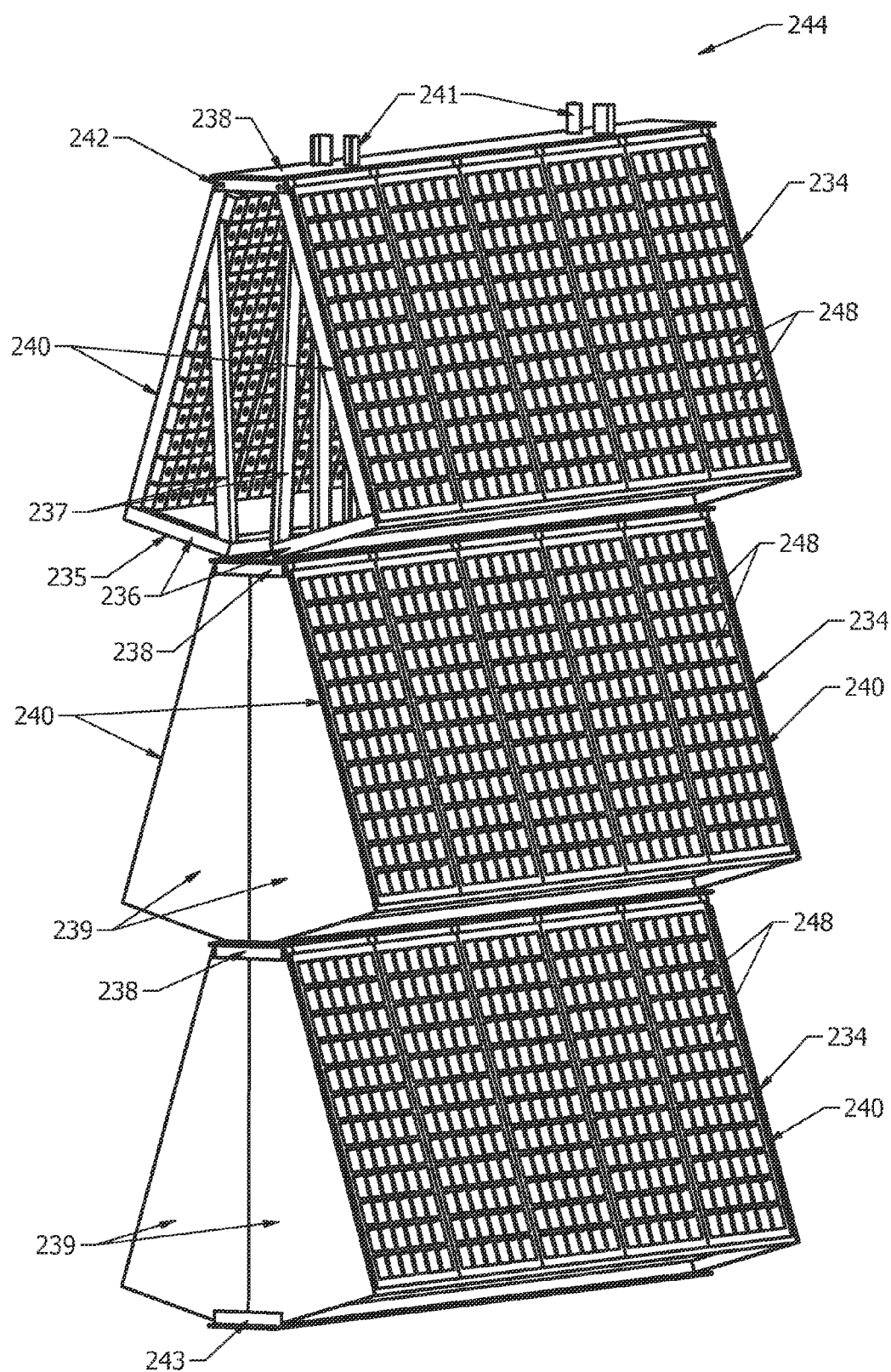
FIG. 6 is a perspective view of an exemplary vegetation growing tower of the illustrative three-dimensional vegetation growing system illustrated in FIG. 5.

At least one assembly branch conduit 212, fitted with a branch conduit inlet valve 213, may extend from the assembly inlet conduit 208. At least one planter tray assembly 234 may be disposed in fluid communication with the assembly inlet conduit 208 through the corresponding assembly branch conduit 212. In some embodiments, at least two planter tray assemblies 234 may be disposed in a stacked configuration to form a vegetation growing tower 244, as illustrated. As illustrated in FIGS. 5 and 6, each planter tray assembly 234 may include an assembly frame 235 which may be aluminum. As illustrated in FIG. 5, in some embodiments, the assembly frames 235 of multiple stacked planter tray assemblies 234 may be mounted on multiple vertical assembly mount members 241. The assembly frame 235 may have a pair of base frame members 236. Frame arms 237 may extend upwardly from the respective base frame members 236. A planter tray support 238 may be supported by the frame arms 237. At least one planter tray 240 may be supported by the assembly frame 235. In some embodiments, a pair of sloped planter trays 240 may be hinged to the planter tray support 238 at a pair of tray hinges 242. Accordingly, each planter tray 240 may be selectively raised to access the interior components of the planter tray assembly 234. Each planter tray 240 may have a grid construction which supports the growth of plants or other vegetation (not illustrated) and has multiple planter tray openings 248. Each planter tray 240 may be fabricated of or coated with a hydroponic growth medium. Non-limiting examples of hydroponic growth media which are suitable materials of construction for the planter trays 240 include organic or inorganic fiber materials; wheat chaff or any chaff from harvesting a product such as oats, barley, etc.; rice hull or other hull material; hay such as grass, alfalfa, etc.; hydroton (fired clay pellets); rock wool; oak leaves; composted soil material; perlite; pumice stone; fired brick chip; hydro gel; sand; gravel of various sizes; or any combination thereof. In some embodiments, the planter trays 234 may be selectively detachable with respect to the assembly frame 235 according to the knowledge of those skilled in the art. Frame end panels 239 may be provided on opposite ends of the assembly frame 235 to maintain moisture within the planter tray assembly 234 and provide moisture to the roots of plants or other vegetation growing on the planter trays 240, as will be hereinafter described. An elongated gutter 243 may extend along the bottom of the lowermost planter tray assembly 234 in each vegetation growing tower 244 for purposes which will be hereinafter described. The liquid return conduit 220 may establish fluid communication between the gutter 243 and the liquid return container 222 for purposes which will be hereinafter described.

As further illustrated in FIG. 5, a planter tray distribution conduit 246 may communicate with the assembly branch conduit 212 of each vegetation growing tower 244. The planter tray distribution conduit 246 may be supported in a vertical position in the vegetation growing tower 244 according to the knowledge of those skilled in the art. A check valve 247 may be provided in the planter tray distribution conduit 246 to prevent backflow of vegetation growth sustaining liquid. Multiple discharge conduits 250 may be disposed in fluid communication with the planter tray distribution conduit 246. The discharge conduits 250 may extend horizontally within the respective planter tray assemblies 234 in each vegetation growing tower 244. Multiple, spaced-apart discharge nozzles 251 may communicate with each discharge conduit 250. The discharge nozzles 251 may be oriented toward the interior surfaces of the planter trays 240 in the planter tray assembly 234.

Figure 7:
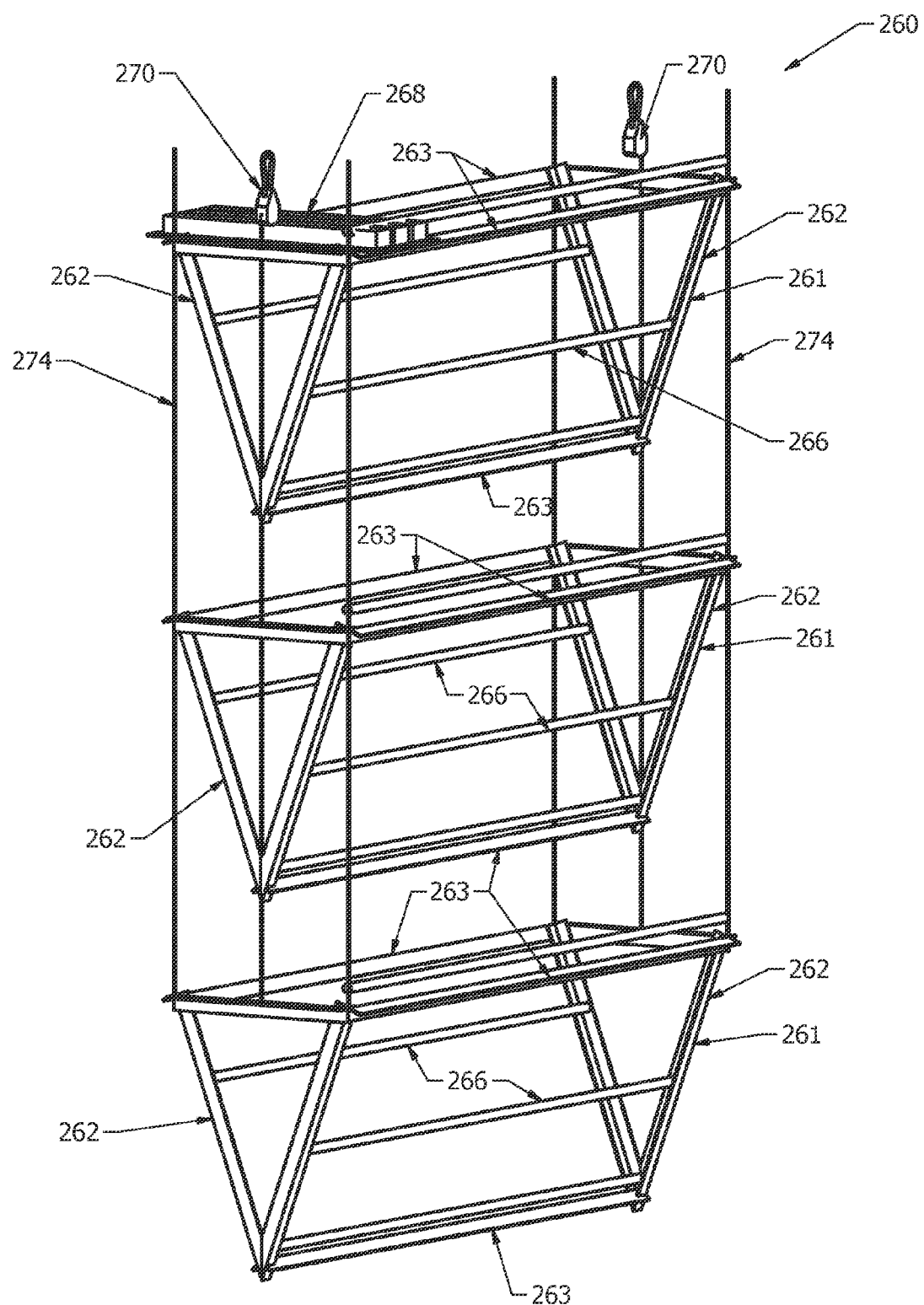
FIG. 7 is a perspective view of an exemplary light fixture of the illustrative three-dimensional vegetation growing system illustrated in FIG. 5.
Figure 8:
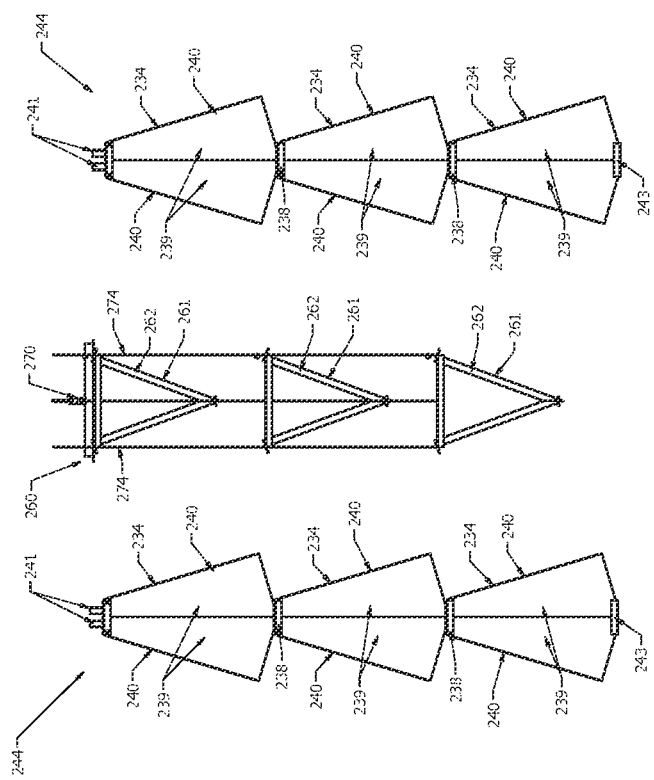
FIG. 8 is a side view of a light fixture suspended between a pair of vegetation growing towers according to the illustrative three-dimensional vegetation growing system illustrated in FIG. 5.

As illustrated in FIGS. 7 and 8, at least one light fixture 260 may be positioned adjacent to each vegetation growing tower 244 in the system 200. In some embodiments, a light fixture 260 may be positioned between each adjacent pair of the vegetation growing towers 244. Fixture suspension cables 274 may suspend the light fixture 260 from a roof or other suitable support structure (not illustrated). As illustrated in FIG. 7, the light fixture 260 may include at least one light fixture frame 261 having a pair of spaced-apart end frame members 262. Multiple connecting frame members 263 may extend between the end frame members 262. Light ballast boxes 268 may be supported by one or more of the light fixture frames 261. The end frame members 262 may be fitted with at least one pair of light sockets (not illustrated) which are electrically connected to the light ballast boxes 268. At least one light source 266 may engage and extend between the light sockets in the respective end frame members 262. In some embodiments, the light source 266 may include at least one source of ultraviolet light. Ratcheting fixture hangers 270 may engage the fixture suspension cables 274 to facilitate selective raising and lowering of the light fixture frames 261.

In typical application, plants or other vegetation (not illustrated) are attached to the planter trays 240 according to the knowledge of those skilled in the art. The roots of the plants or vegetation may extend through planter tray openings 248 in each planter tray 240 and are exposed to the interior of the planter tray assembly 234. A supply of vegetation growth sustaining liquid which may include at least one nutrient is placed in the liquid reservoir 201 (FIG. 5). One or both of the pumps 205 in the manifold 203 may be operated to pump the vegetation growth sustaining liquid from the liquid reservoir 201 through the reservoir outlet conduit 202, one or both of the manifold conduits 204, the assembly inlet conduit 208 and the assembly branch conduit 212 of each planter tray assembly 234. Backflow of the vegetation growth sustaining liquid from the assembly inlet conduit 208 may be collected through the backflow conduit 229 into the backflow container 228.

The vegetation growth sustaining liquid flows from the assembly branch conduit 212 through the planter tray distribution conduit 246 and the discharge conduits 250 in the respective planter tray assemblies 234 of each vegetation growing tower 244. The vegetation growth sustaining liquid is discharged from each discharge conduit 250 through the discharge nozzles 251 and onto the interior surfaces of the respective planter trays 240 of each planter tray assembly 234. Accordingly, the vegetation growth sustaining liquid is applied to the roots of the vegetation to sustain metabolism and growth of the vegetation. The light fixtures 260 are operated to emit light from the light sources 266 (FIG. 7) onto the vegetation to promote photosynthesis in the vegetation.

After it is discharged from the discharge nozzles 251 onto the planter trays 240, the vegetation growth sustaining liquid may drip into the gutter 243 at the bottom of the vegetation growing tower 244. The liquid return conduit 220 may distribute the growth sustaining liquid collected in the gutter 243 to the liquid return container 222. The growth sustaining liquid may be pumped from the liquid return container 222 into the liquid reservoir 201 through the reservoir inlet conduit 224. In some embodiments, the planter trays 240 may be selectively detached from the assembly frame 235 of each planter tray assembly 234 to facilitate removal of the vegetation from the planter trays 240. The planter trays 240 may be pivoted to an open position at the respective tray hinges 242 to facilitate access to the interior components of each planter tray assembly 234 for cleaning, maintenance and/or replacement purposes.

Figure 9:
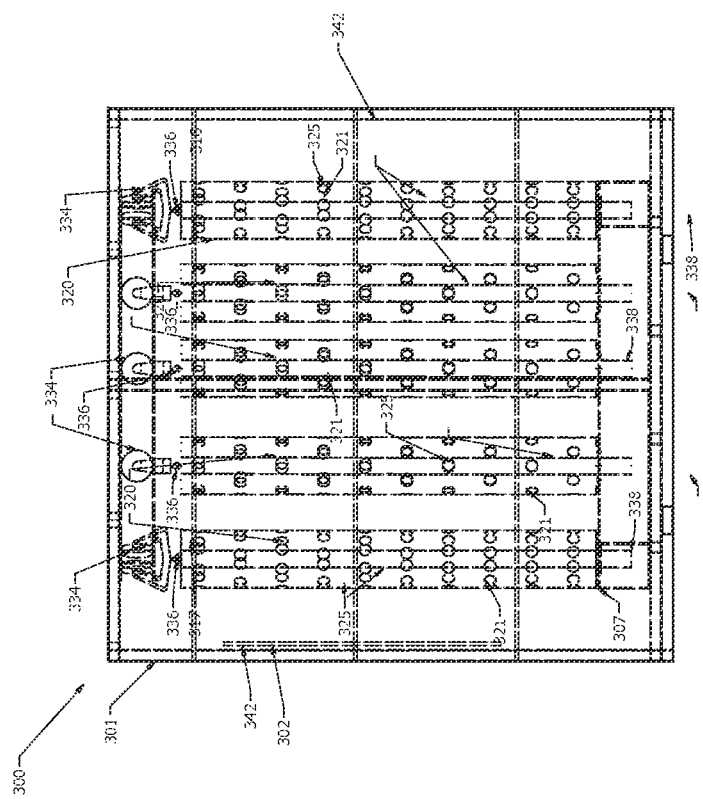
FIG. 9 is a side view of another alternative illustrative embodiment of the three-dimensional vegetation growing systems.
Figure 10:
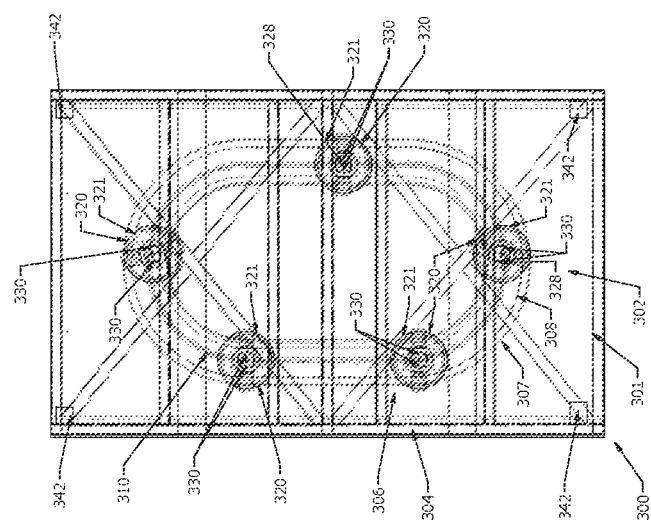
FIG. 10 is a sectional view, taken along section lines 10-10 in FIG. 9, of a typical tower assembly of the illustrative three-dimensional vegetation growing system illustrated in FIG. 9.
Figure 11:
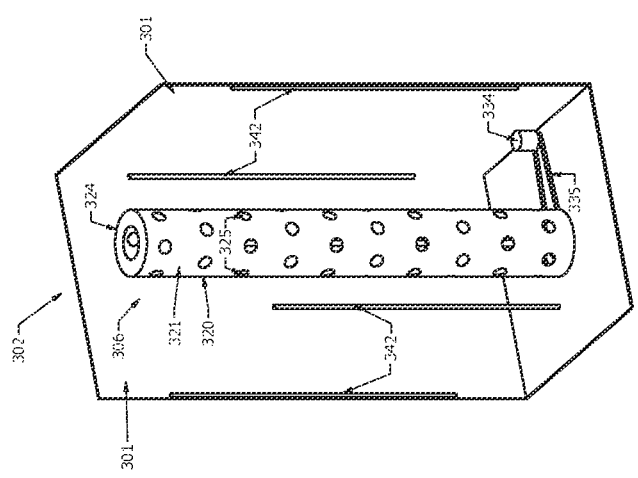
FIG. 11 is a perspective view of an exemplary liquid dispensing tower of the tower assembly according to the illustrative three-dimensional vegetation growing system illustrated in FIG. 9.

Referring next to FIGS. 9-12 of the drawings, another alternative illustrative embodiment of the three-dimensional vegetation growing system is generally indicated by reference numeral 300. The system 300 may include a system housing 301 having a system housing interior 302. As illustrated in FIG. 10, at least one access door 304 may be provided in the system housing 301 to facilitate access to the system housing interior 302 and its contents. As illustrated in FIG. 11, at least one light source 342 may be provided in the housing interior 302. The light sources 342 may be connected to a suitable electrical source (not illustrated) to emit light which supports the growth of vegetation in the system housing interior 302. In some embodiments, the light sources 342 may include at least one source of ultraviolet light. A tower assembly 306 may be provided in the system housing interior 302. As illustrated in FIGS. 9 and 10, in some embodiments, the tower assembly 306 may include a tower assembly base 307. As illustrated in FIG. 10, in some embodiments, the tower assembly base 307 may be generally elongated and elliptical with an outer base wall 308, an inner base wall 309 which is spaced-apart from the outer base wall 308 and a base interior 310 between the outer base wall 308 and the inner base wall 309.

Figure 12:
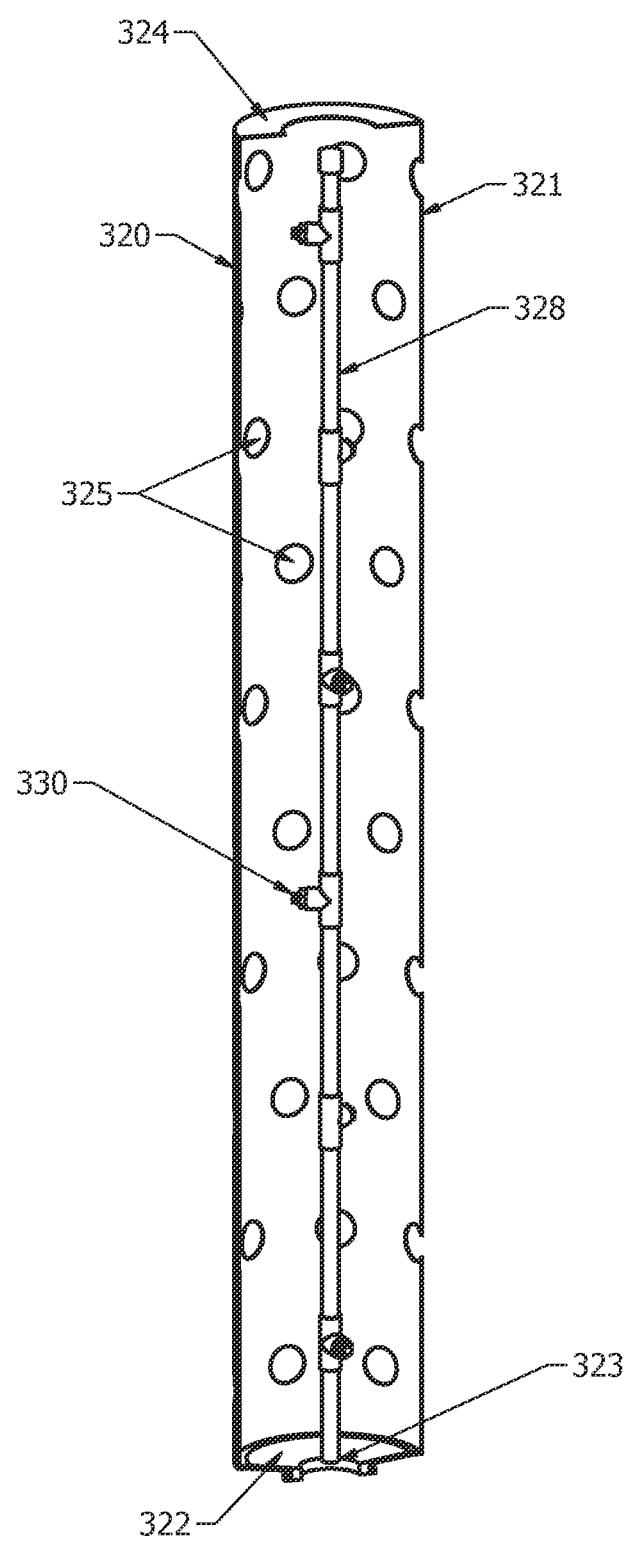
FIG. 12 is a longitudinal sectional view of an exemplary liquid dispensing tower according to the illustrative three-dimensional vegetation growing system illustrated in FIG. 9.

At least one planter tower 320 is provided in the system housing interior 302 in light-receiving proximity to the at least one light source 342. The planter tower 320 may extend upwardly from the tower assembly base 307. In some embodiments, multiple planter towers 320 may extend from the tower assembly base 307 in spaced-apart relationship to each other. As illustrated in FIG. 9, in some embodiments, a tower assembly cap 316 may be provided in the system housing interior 302. The tower assembly cap 316 may be attached to the system housing 301 according to the knowledge of those skilled in the art. The planter towers 320 may be mounted between the tower assembly base 307 and the tower assembly cap 316. In some embodiments, the planter towers 320 may be mounted for selective multi-positional capability along and between the tower assembly base 307 and the tower assembly cap 316 according to the knowledge of those skilled in the art. As illustrated in FIG. 12, each planter tower 320 may include a generally elongated, cylindrical tower shell 321 having a shell lower end 322 and a shell upper end 324. The tower shell 321 may be adapted to rotate on a bearing 323 which may be situated on or between the outer base wall 308 and the inner base wall 309 of the tower assembly base 307. Multiple liquid dispensing openings 325 may extend through the tower shell 321 in a selected size, pattern and spacing. The tower shell 321 of each planter tower 320 may be fabricated of or coated with a hydroponic growth medium. Non-limiting examples of hydroponic growth media which are suitable materials of construction for the tower shell 321 include organic or inorganic fiber materials; wheat chaff or any chaff from harvesting a product such as oats, barley, etc.; rice hull or other hull material; hay such as grass, alfalfa, etc.; hydroton (fired clay pellets); rock wool; oak leaves; composted soil material; perlite; pumice stone; fired brick chip; hydro gel; sand; gravel of various sizes; or any combination thereof.

As further illustrated in FIG. 12, a tower conduit 328 may extend within and along the tower shell 321. In some embodiments, the tower conduit 328 may be generally concentric with the tower shell 321. A fluid inlet conduit 338 (FIG. 9) is disposed in fluid communication with the tower conduit 328. The fluid inlet conduit 338 communicates with a pump and supply mechanism (not illustrated) for a vegetation growth sustaining liquid. At least one fluid discharge nozzle 330 is disposed in fluid communication with the tower conduit 328. In some embodiments, multiple fluid discharge nozzles 330 may be provided along the tower conduit 328 at a selective spacing with respect to each other. The fluid discharge nozzles 330 may be oriented in various directions away from the tower conduit 328 to facilitate discharge of the vegetation growth sustaining liquid under pressure through the liquid dispensing openings 325 in the tower shell 321.

As illustrated in FIGS. 9 and 11, a tower rotation motor 334 drivingly engages the tower shell 321 of each planter tower 320 for rotation of the tower shell 321. As illustrated in FIG. 9, in some embodiments, each tower rotation motor 334 may directly engage each corresponding tower shell 321 through a drive shaft 336. As illustrated in FIG. 11, in other embodiments, the tower rotation motor 334 may drivingly engage the tower shell 321 for rotation through a drive belt 335. Accordingly, as the vegetation growth sustaining liquid is discharged from the fluid discharge nozzles 330 (FIG. 12) on the tower conduit 328, the tower rotation motor 334 rotates the tower shell 321. The discharged vegetation growth sustaining liquid is discharged through the liquid dispensing openings 325 as the liquid dispensing openings 325 periodically align or register with the fluid discharge nozzles 330. The base interior 310 of the tower assembly base 307 may accommodate the tower rotation motors 334, fluid inlet conduits 338, pumps, reservoirs and/or other structure associated with operation of the three-dimensional growing system 300 as well as selective positioning of the planter towers 320 along the tower assembly base 307.

In typical application of the three-dimensional vegetation growing system 300, the roots of plants or other vegetation (not illustrated) are attached to the tower shell 321 of each planter tower 320 according to the knowledge of those skilled in the art. The three-dimensional vegetation growing system 300 may be particularly suitable for growing basil. Light is emitted from the light sources 342 (FIG. 11) in the system housing 301 and strikes the vegetation. As each tower rotation motor 334 is operated to rotate the tower shell 321 of each corresponding planter tower 320, a supply of vegetation growth sustaining liquid which may include at least one nutrient is pumped through the fluid inlet conduit 338 (FIG. 9) and the tower conduit 328 (FIG. 12) of the planter tower 320. The vegetation growth sustaining liquid is discharged from the fluid discharge nozzles 330 through the liquid dispensing openings 325 of the rotating tower shell 321 and onto the roots of the vegetation 346. Accordingly, the vegetation growth sustaining liquid sustains metabolism and growth of the vegetation. As illustrated in FIG. 10, the planter towers 320 of the tower assembly 306 in the system housing interior 302 and the vegetation growing on the planter towers 320 may be accessed through the access door 304 (FIG. 10). It will be appreciated by those skilled in the art that rotation of the tower shells 321 of the respective planter towers 320 may facilitate uniform exposure of the vegetation to the light emitted from the light sources 342 with reduction of the overall consumption of power and generation of heat in the system housing interior 302.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A three-dimensional vegetation growing system for rotatably exposing vegetation to nutrients, liquids and light, the three-dimensional vegetation growing system comprising:
    a system housing having a system housing interior;
    at least one light source in an upper portion of the system housing interior of the system housing;
    at least one light source in a lower portion of the system housing interior of the system housing;
    at least one planter tower in the system housing interior in light-receiving proximity to the at least one light source, the at least one light source exterior to the at least one planter tower and the at least one planter tower having:
        a tower shell disposed for rotation;
        a plurality of liquid dispensing openings in the tower shell;

a tower conduit in the tower shell, the tower conduit stationary relative to the tower shell; and a plurality of fluid discharge nozzles communicating with the tower conduit; and a tower rotation motor drivingly engaging the tower shell of the at least one planter tower for rotation.

2. The three-dimensional vegetation growing system of claim 1 further comprising at least one access door in the system housing.

3. The three-dimensional vegetation growing system of claim 1 wherein the tower shell is generally elongated and cylindrical.

4. The three-dimensional vegetation growing system of claim 1 wherein the at least one light source comprises an ultraviolet light source.

5. The three-dimensional vegetation growing system of claim 1 further comprising a tower assembly base, and wherein the at least one planter tower is carried by the tower assembly base.

6. The three-dimensional vegetation growing system of claim 5 wherein the at least one planter tower is mounted for selective multi-positional capability along the tower assembly base.

* * * * *